United States Patent
Dai et al.

(10) Patent No.: US 8,045,609 B2
(45) Date of Patent: *Oct. 25, 2011

(54) ADAPTIVE EQUALIZATION EMPLOYING PATTERN RECOGNITION

(75) Inventors: Xingdong Dai, Whitehall, PA (US); Geoffrey Zhang, Allentown, PA (US); Max Olsen, Mertztown, PA (US); Dwight Daugherty, Ephrata, PA (US)

(73) Assignee: Agere Systems Inc., Allentown, PA (US)

( * ) Notice: Subject to any disclaimer, the term of this patent is extended or adjusted under 35 U.S.C. 154(b) by 627 days.

This patent is subject to a terminal disclaimer.

(21) Appl. No.: 12/221,003

(22) Filed: Jul. 30, 2008

(65) Prior Publication Data

US 2010/0027606 A1 Feb. 4, 2010

(51) Int. Cl.
*H03H 7/30* (2006.01)
(52) U.S. Cl. ........ 375/232; 375/233; 375/231; 375/348; 375/349; 370/222
(58) Field of Classification Search ............ 375/232, 375/233, 348, 349; 370/222
See application file for complete search history.

(56) References Cited

U.S. PATENT DOCUMENTS

| | | | | |
|---|---|---|---|---|
| 7,639,736 B2* | 12/2009 | Farjad-rad | .................... | 375/232 |
| 7,639,737 B2* | 12/2009 | Palmer | .......................... | 375/232 |
| 2002/0060820 A1* | 5/2002 | Buchali | ........................ | 359/109 |
| 2005/0008070 A1* | 1/2005 | Wang et al. | ................... | 375/232 |
| 2005/0047500 A1* | 3/2005 | Gupta et al. | .................. | 375/232 |
| 2005/0169168 A1* | 8/2005 | Aronson et al. | ............. | 370/222 |
| 2009/0086807 A1* | 4/2009 | Aziz et al. | ..................... | 375/233 |
| 2009/0141828 A1* | 6/2009 | Huang et al. | ................. | 375/296 |
| 2010/0329322 A1* | 12/2010 | Mobin et al. | ................. | 375/231 |

* cited by examiner

*Primary Examiner* — Eva Puente (57) ABSTRACT

In described embodiments, an adaptive equalizer employed by a receiver in a communication channel, such as Fiber Channel, employs pattern recognition. When a repeating pattern, such as an IDLE or ARBFF pattern, is employed by a standard to, for example, maintain a communication link, an equalizer of the receiver might adaptively set its equalizer parameters based on characteristics of the signal energy of the repeating pattern rather than adaptively set its equalizer parameters based on characteristics of the signal energy of generally random user data carried on the link. Pattern recognition by the receiver allows for maintaining adaptive equalizer parameters at settings preferred for data detection of the typical random data, improving data detection performance of the receiver when the channel transitions from a preset or synchronization repeating pattern to a user random data pattern.

9 Claims, 5 Drawing Sheets

■ NON-DFE DECISION
▨ DFE DECISIONS FOR PRBS (NEAR-SYMMETRIC)
▧ DFE DECISIONS FOR ARBFF (NON-SYMMETRIC)

FIG. 6

ADAPTIVE EQUALIZATION EMPLOYING PATTERN RECOGNITION

CROSS-REFERENCE TO RELATED APPLICATIONS

The subject matter of this application is related to U.S. patent application Ser. No. 12/221,002 filed Jul. 30, 2008, the teachings of which are incorporated herein by reference.

BACKGROUND OF THE INVENTION

1. Field of the Invention

The present invention relates to communication systems, and, in particular, to adaptive equalization using pattern recognition.

2. Description of the Related Art

Fibre Channel (FC) is a high performance communications interconnect standard specifying data transfer that is capable of transporting a relatively great amount of user data traffic between, for example, desktop workstations, mass storage devices, peripheral components, and host systems at rates much faster that those present in typical local area network (LAN) communication networks. FC is rapidly becoming a generally accepted network architecture for stage area networks (SANs), which are increasingly important for managing the large volume and complexity of data in post internet-era applications.

One component of FC devices is a serializer and de-serializer (SerDes) device that is commonly used in high speed communications to convert data between serial and parallel interfaces in each transmit/receive direction. A common coding scheme used with SerDes devices, such as those employed in FC, is (8B10B) coding. All information is first encoded 8-bits at a time into a 10-bit transmit character. The 10-bit character is then sent serially bit-by-bit over a communication link, such as an electrical or optical link. This (8B10B) encoding supports DC-balance, provides framing, and guarantees signal transitions. Guaranteed transitions allow a receiver to extract the embedded clock signal (clock data recovery, or CDR), while control codes allow framing, typically on the start of a data packet. This encoding scheme also improves error detection with running disparity, providing separation of data bits from control bits, and permits derivation of byte and word synchronization. The typical (8B10B) SerDes parallel side data bus interface has 1 clock line and 8 (or multiples of 8) data lines for each transmit and receive lane.

SerDes systems transfer data, but during some periods data might not be sent over the communication link. During these non-data periods, many standards, including FC, specify that a primitive signal be employed to keep a low-energy signal with transitions in the link, allowing for continued timing extraction and reduction of sample-timing wander at the front end of the receiver. By keeping a receiver's front end active, the receiver can transition to active data detection relatively rapidly while maintaining a low bit error rate (BER).

An important signal degradation that occurs in SerDes devices is from electromagnetic interference (EMI) introduced by toggling signals, which EMI degradation increases as data rates increase. Generation of EMI is closely regulated by the FCC (Federal Communications Commission) since it can interfere with other user devices. Consequently, lowering the EMI of a device might lower device costs of a given implementation by lowing shielding requirements.

To reduce lower EMI while minimizing impact to existing designs, the T11 Technical Committee has proposed replacing the currently employed primitive signal IDLE with an ARBFF signal for synchronization. The ARBFF signal exhibits a lower transition density than the IDLE signal. Both an IDLE signal and an ARBFF signal are specified as an "ordered set" of signals where each element of the ordered set exhibits a distinct pattern. Table 1 summarizes the FC data rates and proposed primitive signals for those data rates.

TABLE 1

| FC Standard | Serial Data Rate | Primitive Signal | Beginning Running Disparity | Ordered Set |
|---|---|---|---|---|
| 1G | 1.0625 Gbps | IDLE | Negative | K28.5-D21.4-D21.5-D21.5 |
| 2G | 2.125 Gbps | IDLE | Negative | K28.5-D21.4-D21.5-D21.5 |
| 4G | 4.25 Gbps | IDLE | Negative | K28.5-D21.4-D21.5-D21.5 |
| 8G | 8.5 Gbps | ARBFF | Negative | K28.5-D20.4-D31.7-D31.7 |
| 10G | 10.51875 Gbps | ARBFF | Negative | K28.5-D20.4-D31.7-D31.7 |

Lower transitional density of the ARBFF signal's repeating data pattern, however, works against adaptive equalization (AEQ) by the receiver, and SerDes receiver performance in general. The effect is amplified when data traffic resumes after a long period of link synchronization. During the long period of non-random repeating data patterns and with low transitional density, AEQ might drifts away from relatively optimum settings for random data detection, leading to incorrect data decisions or data corruption once user data traffic resumes.

SUMMARY OF THE INVENTION

In one embodiment of the present invention, equalization is applied to an input signal. Data values are detected from the equalized input signal to provide a detected data sequence; and the presence or absence of a predetermined signal pattern in the detected data sequence is detected. Equalization of the input signal is modified based upon the detected presence or absence of the predetermined signal pattern.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with exemplary embodiments of the present invention, an adaptive equalizer employed by a receiver in a communication channel, such as Fibre Channel, employs pattern recognition for setting of equalization parameters. When a repeating pattern, such as an IDLE or ARBFF pattern, is employed by a standard to, for example, maintain a communication link, an equalizer of the receiver might adaptively set its equalizer parameters based on characteristics of the signal energy of the repeating pattern rather than adaptively set its equalizer parameters based on characteristics of the signal energy of generally random user data carried on the link. Pattern recognition by the receiver allows for maintaining adaptive equalizer parameters at settings preferred for data detection of, for example, the typical random data, improving data detection performance of the receiver when the channel transitions from idle pattern data to user data.

Figure 1:
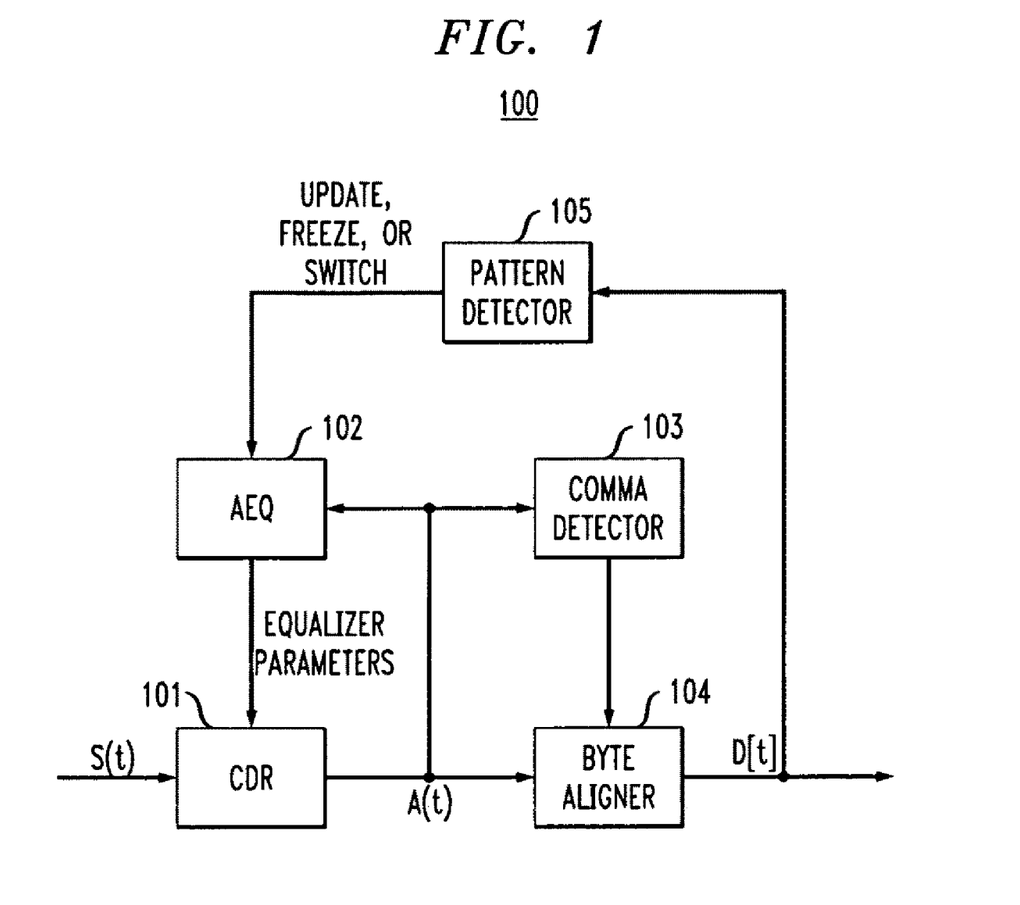
FIG. 1 shows a block diagram of receiver operating in accordance with exemplary embodiments of the present invention.

Operation of an exemplary (e.g., SerDes) receiver) operating in accordance with exemplary embodiments of the present invention is now described. FIG. 1 shows a block diagram of receiver 100 having clock data recovery circuit (CDR) 101, adaptive equalizer (AEQ) 102, comma detector (CD) 103, byte aligner (BA) 104, and pattern detector 105 operating in accordance with the first exemplary embodiment of the present invention. CDR 101 recovers clock timing and data from the input signal S(t). CDR 101 also applies equalization to the input signal S(t) using equalization parameters from AEQ 102 to generate A(t). AEQ 102 is an adaptive equalizer that generates equalizer parameters for equalization of the input signal (data) with the aid of an eye profile, described subsequently, and might employ analog linear equalization (ALE) and decision feedback equalization (DFE) in concert with CDR 101. Consequently, CDR 101 and AEQ 102 use previous decisions for previous received data values contained in A(t) to generate a determination (decision) for the current received data (e.g., bit) value in A(t). AEQ 102 generates relatively optimum parameters for CDR 101 based upon the equalized signal A(t), and decisions generated for the data in an analog linear equalized signal by DFE.

CDR 101 might include a serial-to-parallel converter for subsequent processing. A data string from CDR 101 is applied to CD 103, which detects the comma character. The comma character refers to the K28.x symbol, where K28.5 is most frequently used as this symbol. Each symbol has unique "110 0000" or "001 1111" patterns among all 8B10B encoded data. Once the comma character is detected as to the bit offset from the parallel bus LSB or MSB, BA 104 will then shift the assembled data with that offset. Therefore, at the parallel interface, no shuffled data occurs and this eases digital ASIC parsing the data.

The data string from CDR 101 is applied to BA 104, which reassembles the data words based on the output of CD 103 to provide D[t]. Reassembled data words are provided to pattern detector 105, which detects predetermined patterns in the data, as described subsequently. Since the primitive signal ARBFF for FC is an ordered set of four-characters, and the first character is K28.5, this allows for relatively simple design implementations for pattern detector 105. Pattern detector 105 might also be placed after an (8B10B) decoder, reducing the pattern size to 32-bits. Pattern detector 105, based upon the detected presence or absence of the predetermined pattern, generates a signal that causes AEQ 102 to either update, freeze, or switch equalization parameters subsequently employed by CDR 101.

Figure 2:
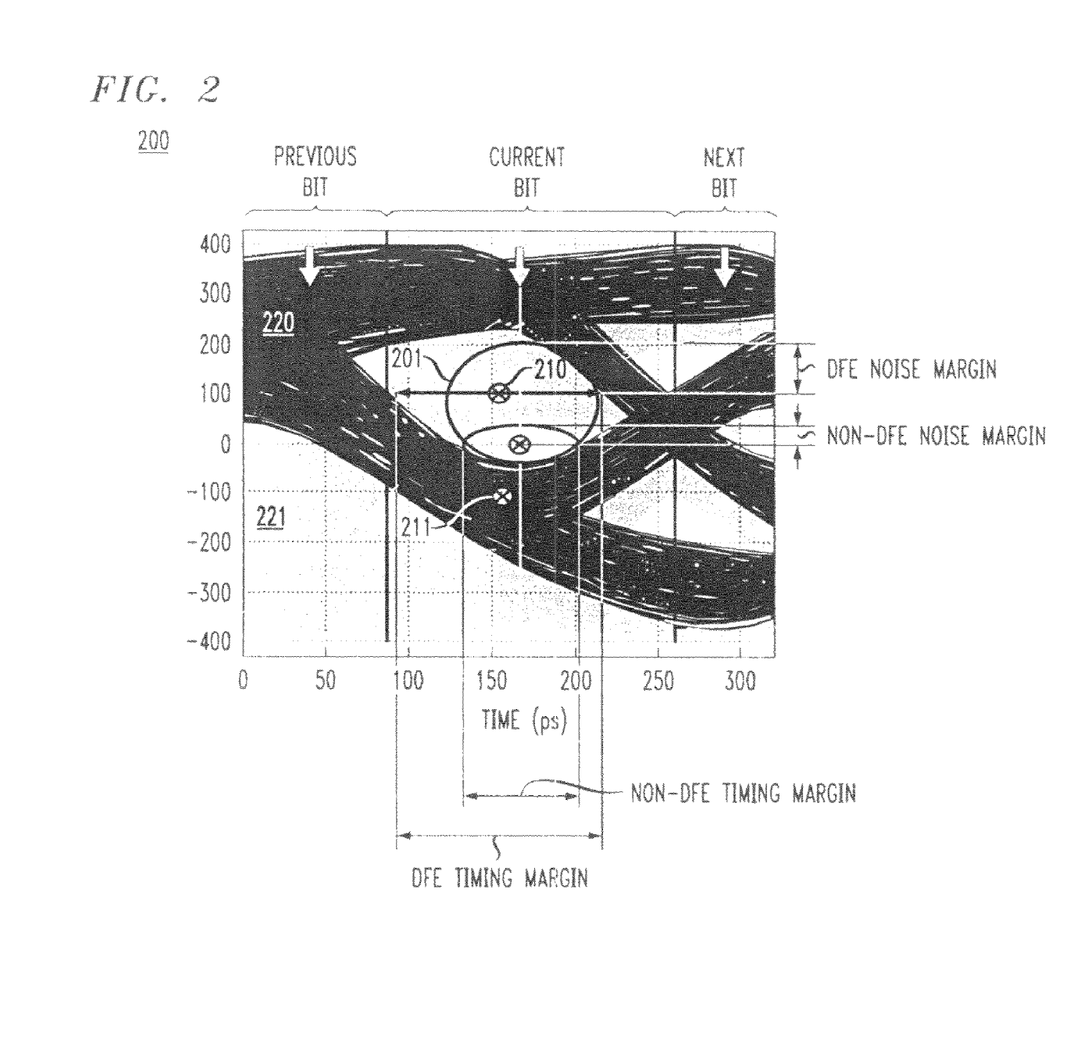
FIG. 2 shows an eye diagram of data for the receiver of FIG. 1.

Integrity of high-speed data detection might be studied in terms of an eye diagram, such as eye diagram 200 shown in FIG. 2, where traces of received signal waveforms are overlaid on top of each other in one or more unit intervals (UIs). An eye diagram such as eye diagram 200 has a vertical dimension (y-axis) in, for example, millivolts (mV) and a horizontal dimension (x-axis) in, for example, picoseconds (ps).

For relatively optimal performance by an algorithm employed by AEQ 102, two conditions are preferred: first, the eye opening for the equalized signal should be large, and second, data latches employed to make a decision should operate near the center of the eye resolved by DFE 103. Based on previous data decisions, the algorithm employed by AEQ 102 locates two DFE-resolved eyes: one eye 201 at the top and one eye (obscured by top trace 220 in FIG. 2) at the bottom of the eye diagram. For example, a decision at the top 220 of the eye diagram corresponds to a trace from a previous bit value of logic "1" to the current bit value, and a decision at the bottom 221 of the eye diagram corresponds to a trace from a previous bit value of logic "0" to the current bit value.

Both DFE-eye openings are relatively larger than both non-DFE eye openings. AEQ 102 employs two data latches (not shown in FIG. 1), with one latch point 210 allocated to a decision for the top eye opening and one latch point 211 allocated to the bottom eye opening. AEQ 102 sets the decision threshold for each data latch at the center of the corresponding eye opening, with such setting for each decision threshold having a corresponding vertical position controlled by an amplitude threshold and a corresponding horizontal position controlled by a phase threshold. Note that width of the DFE resolved eye is wider due to enhanced DFE timing margin, and that the height of the DFE resolved eye is higher due to enhanced DFE noise margin.

Figure 3A:
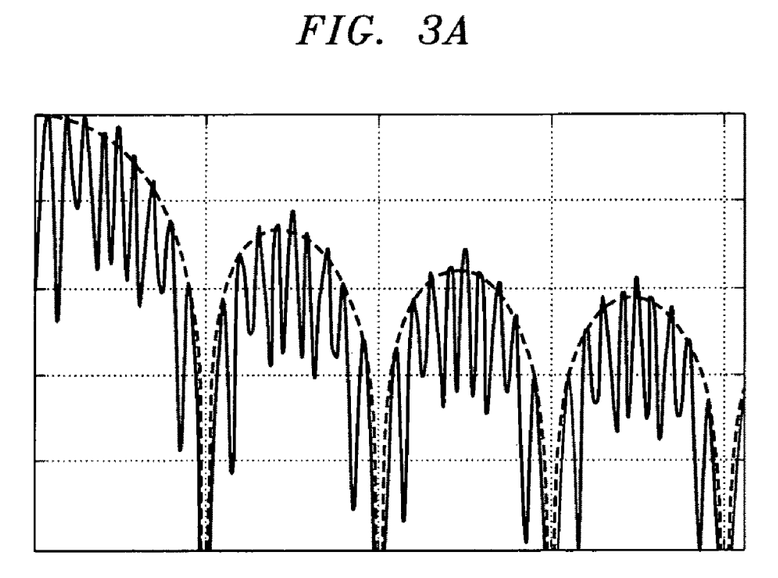
FIG. 3A shows a spectral content of an ARBFF repeating pattern.
Figure 3B:
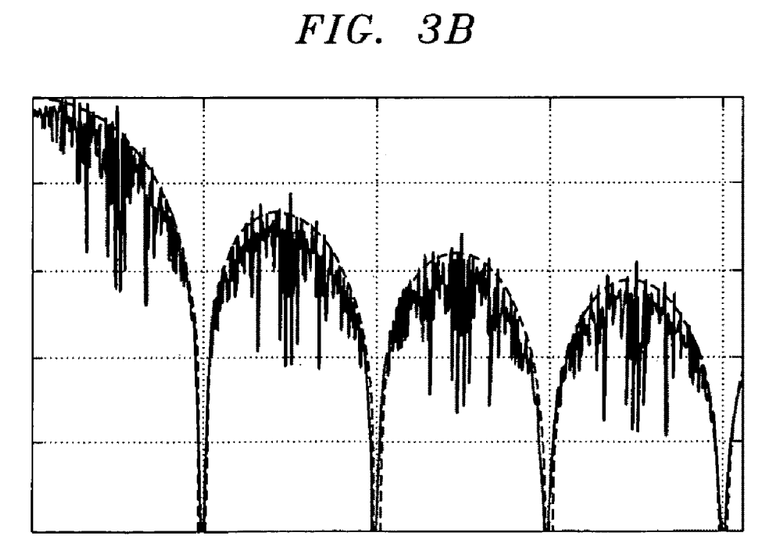
FIG. 3B shows a spectral content of a PRBS repeating pattern.

For the exemplary described embodiments with respect to a Fibre Channel (FC) application, information transmitted is first encoded 8-bits at a time into 10-bit transmit characters (8B10B), and the 10-bit characters are sent serially bit-by-bit over the electrical or optical link. 8B10B encoding ensures that sufficient transitions exist for clock data recovery (CDR), and a user data sequence is generally random in nature, and so can be approximated by a pseudo-random bit sequence (PRBS), such as a $(2^7-1)$ PRBS pattern, for analysis and characterization of circuit/processing performance. FIG. 3A shows a spectral content of an ARBFF repeating pattern, and FIG. 3B shows a spectral content of a $(2^7-1)$ PRBS repeating pattern. As shown in FIGS. 3A and 3B, a difference exists in spectral content between the ARBFF pattern and the pseudo-random data pattern (and, similarly, the random user data), which difference might change the characteristics of a corresponding eye-diagram for the receiver such as that shown in FIG. 1.

Figure 4A:
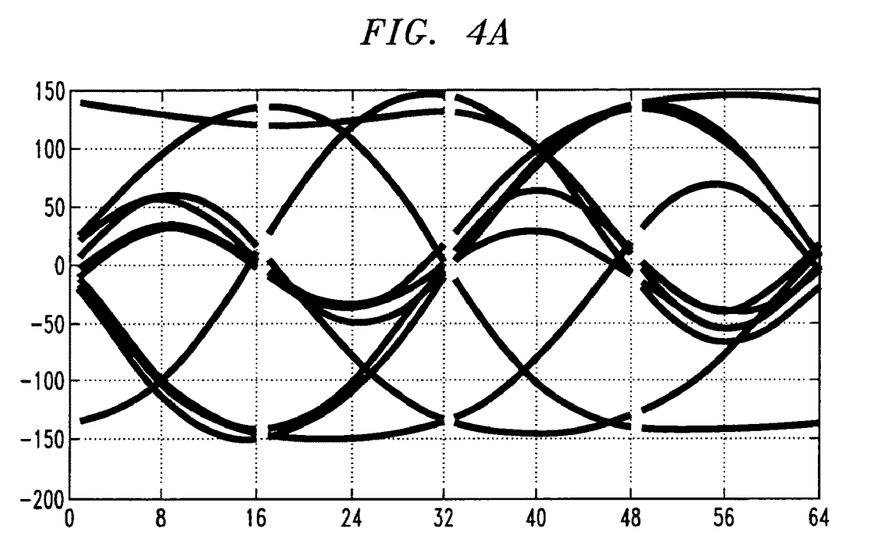
FIG. 4A shows an eye-diagram generated for the ARBFF repeating pattern.
Figure 4B:
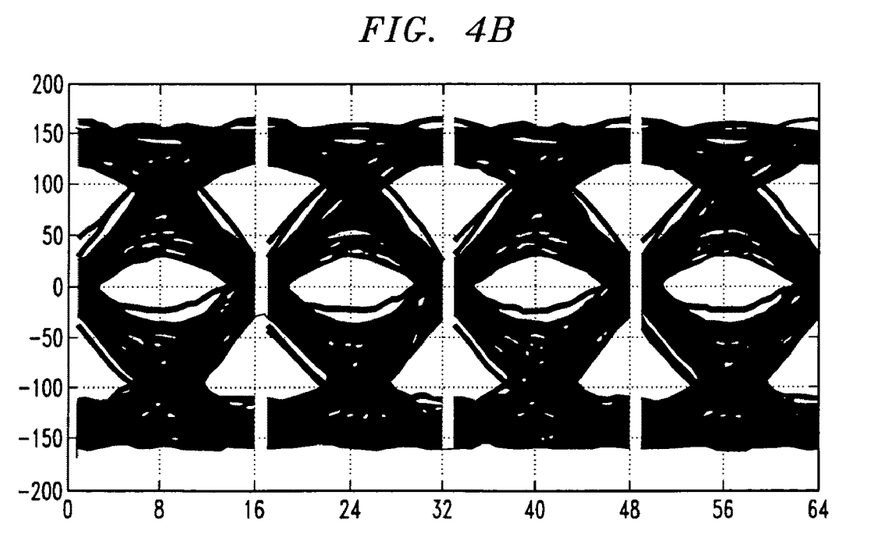
FIG. 4B shows an eye-diagram generated for the PRBS repeating pattern.
Figure 5:
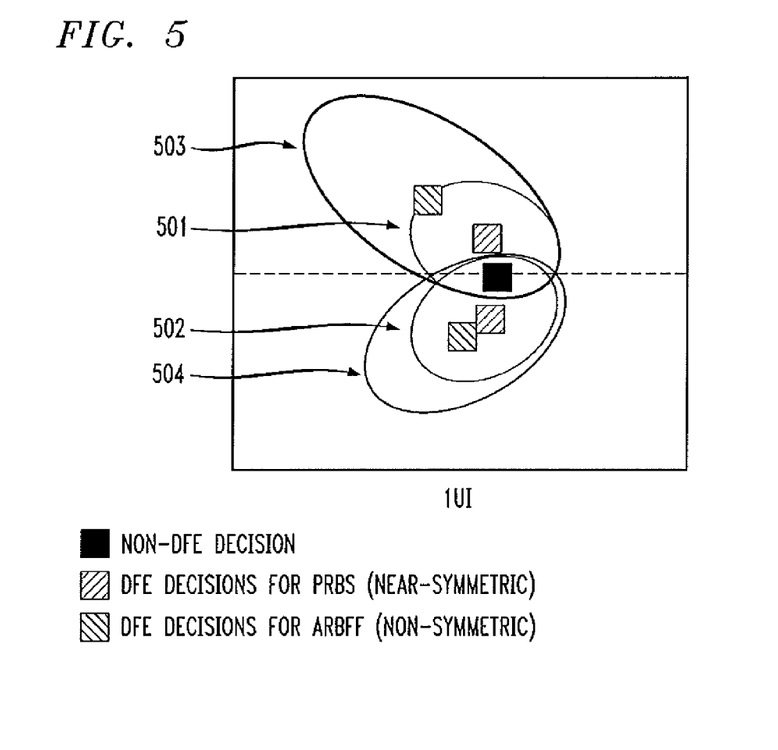
FIG. 5 illustrates differences between top and bottom DFE eyes of an eye diagram for ARBFF and PRBS repeating patterns.

FIG. 4A shows an eye-diagram generated for an ARBFF repeating pattern, and FIG. 4B shows an eye-diagram generated for a ($2^7-1$) PRBS repeating pattern. FIG. 5 illustrates differences between top and bottom DFE eyes of the eye diagrams for ARBFF and ($2^7-1$) PRBS repeating patterns shown in FIGS. 4A and 4B. Comparing the DFE eyes of FIGS. 4A and 4B as shown in FIG. 5, top DFE eye 501 and bottom DFE eye 502 for a random pattern have nearly identical, symmetric shape, while top DFE eye 503 and bottom DFE eye 504 for an ARBFF repeating pattern are non-symmetric. The center of the vertical axis corresponds to a non-DFE decision point. Consequently, latch decision thresholds are different for AEQ 101 for ARBFF and random data cases. Table 2 gives exemplary values for the DFE eye characteristics for the ARBFF and ($2^7-1$) PRBS repeating patterns.

TABLE 2

| Pattern | Feature | UI#1 | UI#2 | UI#3 | UI#4 |
|---|---|---|---|---|---|
| ABRFF | Top Eye Height | 216 | 132 | 189 | 186 |
| | Bottom Eye Height | 122 | 215 | 107 | 142 |
| | Absolute Delta (Difference) | 94 | 83 | 82 | 44 |
| | Ratio (large-to-small) | 1.77 | 1.63 | 1.77 | 1.31 |
| PRBS | Top Eye Height | 97 | 95 | 97 | 95 |
| | Bottom Eye Height | 101 | 105 | 102 | 100 |
| | Absolute Delta (Difference) | 4 | 10 | 5 | 5 |
| | Ratio (large-to-small) | 1.04 | 1.11 | 1.05 | 1.05 |

As shown in Table 2, an absolute difference in eye height is 10 mv maximum for a random pattern, and 44 mV minimum for the ARBFF pattern. Alternatively, the absolute ratio of eye height is 1.11 maximum for the random pattern and 1.31 minimum for the ARBFF pattern. Consequently, a receiver can monitor at least one of the eye height and absolute ratio of eye height to determine the presence or absence of the ARBFF pattern. One skilled in the art might extend this technique of eye monitoring to identify the presence or absence of other types of repeating patterns.

Once the eye characteristics (either DFE eye or non-equalized) are known, a receiver might employ the detection of the presence or absence of the ARBFF pattern to modify the adaptation pattern of the AEQ for optimal performance with either the ARBFF pattern or random data, whichever is detected. Modifying the adaptation pattern of the AEQ for optimal performance with either the ARBFF pattern or random data might comprise modifying the horizontal and/or vertical threshold components for the top and bottom eye decision latches when detecting the data. In addition, the receiver might also either i) freeze control of the DFE operation or ii) continue to adapt parameters of the DFE for better monitoring of the DFE-eye characteristics to determine more accurately when the ARBFF repeating pattern terminates.

Figure 6:
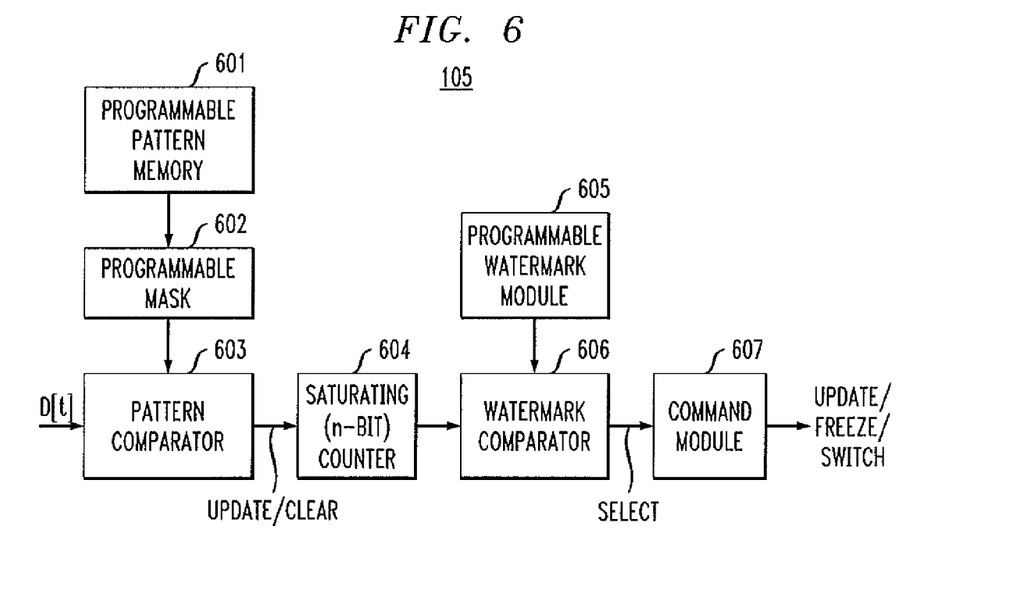
FIG. 6 shows a block diagram of an exemplary embodiment for the pattern detector of FIG. 1 operating in accordance with an exemplary embodiment of the present invention.

FIG. 6 shows a block diagram of an exemplary embodiment for pattern detector 105 of FIG. 1 operating in accordance with an exemplary embodiment of the present invention. Pattern detector 105 comprises programmable pattern memory 601, programmable mask 602, and pattern comparator 603. Pattern detector 105 further comprises saturating (n-bit) counter 604, programmable watermark module 605, watermark comparator 606, and command module 607.

Programmable pattern memory 601 receives a predetermined pattern, such as the ARBFF pattern, for detection. Optional programmable mask 602 is employed to mask portions of the pattern from memory based on a predefined profile, allowing for all or only a portion of the pattern to be matched. For example, the ARBFF primitive signal contains the first two characters K28.5 and D20.4, which are shared by many primitive signals. Pattern comparator 603 compares the input data D[t] to the masked pattern from the programmable mask 602 (or the whole pattern from programmable pattern memory 601).

If pattern comparator 603 detects an occurrence of the pattern, an update (e.g., +1) is applied to saturating (n-bit) counter 604. Saturating (n-bit) counter 604 saturates at the value of n without resetting. The output of saturating (n-bit) counter 604 is compared to a watermark value from programmable watermark module 605 by watermark comparator 606. The watermark value represents the number of detected occurrences of the predetermined pattern, and is variable based upon the predefined value stored in programmable watermark module 605. A programmable watermark value allows an implementation to increase accuracy (higher watermark value) or increase response time (lower watermark value).

When watermark comparator 606 detects that the watermark value has been reached by saturating (n-bit) counter 604, a select signal is provided to command module 607. Command module generates a freeze or switch signal based on the select signal so as to cause equalization parameter update operation of the AEQ to stop and for the AEQ to either freeze its values or select an alternative set of equalization values, respectively.

If pattern comparator 603 detects the absence of the pattern, a clear signal is applied to saturating (n-bit) counter 604 to reset saturating (n-bit) counter 604. The output of saturating (n-bit) counter 604 is then compared to the watermark value from programmable watermark module 605 by watermark comparator 606. Watermark comparator 606 generates the select signal so as to cause command module 607 to generate an update signal to restore the equalization parameter update operation of the AEQ for equalization of user data.

When an FC link is first established, the link performs a set of protocols to establish the link to negotiate the connection parameters. After this negotiation period, the AEQ algorithm provides relatively stable equalization parameters, which are subsequently fine-tuned over subsequent data traffic, allowing for relatively precise output data that can be matched by the pattern detector. In addition, on-chip built-in self-test (BIST) circuitry of an integrated circuit (IC) design might be employed to generate sets of equalizer parameters and test operation of the update/freeze/switch process of the AEQ algorithm when in use.

A system employing embodiments of the present invention might exhibit the following advantages. AEQ adaptation parameters are consistent and repeatable. Separate adaptation algorithms might be employed for user data (e.g., 8B10B), ARBFF, IDLE, and other defined patterns. Such methods might be easily implemented in current systems with little or no hardware changes, and the settings might be easily generated and modified in real time.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Apparatus for application of equalization to a signal, the apparatus comprising:
an equalizer configured to apply equalization to an input signal;
a detector configured to detect data values from the equalized input signal to provide a detected data sequence; and
a pattern detector configured to:
compare portions of the detected data sequence with a copy of predetermined signal pattern from memory; and
detect the presence or absence of a predetermined signal pattern in the detected data sequence based upon the comparison,
a pattern mask adapted to mask portions of the copy of predetermined signal pattern from memory, wherein the pattern detector detects the presence or absence of the predetermined pattern by comparing the detected data with the masked predetermined pattern,
wherein the equalizer is further adapted to modify the equalization applied to the input signal based upon the detected presence or absence of the predetermined signal pattern.

2. Apparatus for application of equalization to a signal, the apparatus comprising:
an equalizer configured to apply equalization to an input signal;
a detector configured to detect data values from the equalized input signal to provide a detected data sequence; and
a pattern detector configured to detect the presence or absence of a predetermined signal pattern in the detected data sequence, wherein the pattern detector detects the predetermined signal pattern in the detected data sequence either before or after applying the detected data sequence to a decoder configured to decode the detected data sequence,
wherein the equalizer is further adapted to modify the equalization applied to the input signal based upon the detected presence or absence of the predetermined signal pattern.

3. Apparatus for application of equalization to a signal, the apparatus comprising:
an equalizer configured to apply equalization to an input signal;
a detector configured to detect data values from the equalized input signal to provide a detected data sequence; and
a pattern detector configured to detect the presence or absence of a predetermined signal pattern in the detected data sequence,
wherein the equalizer is further adapted to modify the equalization applied to the input signal based upon the detected presence or absence of the predetermined signal pattern, and wherein the equalizer comprises an adaptive equalizer configured to modify the equalization applied to the input signal based upon the detected presence or absence of the predetermined signal pattern by setting at least one of a vertical threshold and a horizontal threshold of a upper latch associated with an upper eye of an eye profile and setting at least one of a vertical threshold and a horizontal threshold of a lower latch associated with a lower eye of an eye profile.

4. Apparatus for application of equalization to a signal, the apparatus comprising:
an equalizer configured to apply equalization to an input signal;
a detector configured to detect data values from the equalized input signal to provide a detected data sequence; and
a pattern detector configured to detect the presence or absence of a predetermined signal pattern in the detected data sequence,
wherein the equalizer is further adapted to modify the equalization applied to the input signal based upon the detected presence or absence of the predetermined signal pattern, and wherein the apparatus is configured to delay modification of the equalization over several detected instances of the predetermined pattern in the input signal.

5. The apparatus of claim 4, wherein the pattern detector comprises a pattern comparator and a counter, wherein the pattern comparator increments the counter for each occurrence of the predetermined pattern in the detected sequence to delay modification.

6. The apparatus of claim 5, wherein the pattern detector comprises a watermark comparator configured to i) compare a value of the counter with a watermark value; and ii) generate a select signal when the value of the counter reaches the watermark value.

7. The apparatus of claim 5, wherein the pattern comparator clears the counter when the absence of the predetermined pattern in the detected data sequence occurs.

8. A method of applying equalization to a signal, the method comprising the steps of:
   a) applying, initially, equalization to an input signal;
   b) detecting data values from the equalized input signal to provide a detected data sequence;
   c) detecting the presence or absence of a predetermined signal pattern in the detected data sequence, further comprising:
     c1) comparing portions of the detected data sequence with a copy of predetermined signal pattern from the memory to detect the presence or absence of the predetermined pattern based upon the comparison; and
     c2) masking portions of the copy of predetermined signal pattern from memory to detect the presence or absence of the predetermined pattern and comparing the detected data with the masked predetermined pattern; and
   d) modifying the equalization applied to the input signal based upon the detected presence or absence of the predetermined signal pattern.

9. A method of applying equalization to a signal, the method comprising the steps of:
   a) applying, initially, equalization to an input signal;
   b) detecting data values from the equalized input signal to provide a detected data sequence;
   c) detecting the presence or absence of a predetermined signal pattern in the detected data sequence;
   d) modifying the equalization applied to the input signal based upon the detected presence or absence of the predetermined signal pattern; and
   e) delaying modification of the equalization over several detected instances of the predetermined pattern in the input signal.

* * * * *